(12) United States Patent
Kelley et al.

(10) Patent No.: US 11,235,882 B2
(45) Date of Patent: Feb. 1, 2022

(54) SEAT PAN ADJUSTMENT SYSTEM FOR EJECTION SEATS

(71) Applicant: AMI Industries, Inc., Colorado Springs, CO (US)

(72) Inventors: Ryan Matthew Kelley, Rockford, IL (US); Steve Holstine, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 173 days.

(21) Appl. No.: 16/697,753

(22) Filed: Nov. 27, 2019

(65) Prior Publication Data

US 2021/0155349 A1 May 27, 2021

(51) Int. Cl.
*B64D 25/10* (2006.01)
*B64D 11/06* (2006.01)

(52) U.S. Cl.
CPC .......... *B64D 25/10* (2013.01); *B64D 11/0689* (2013.01)

(58) Field of Classification Search
CPC ................ B64D 25/10; B64D 11/0689; B60N 2002/022; B60N 2/161; B60N 2/1615; B60N 2/162; B60N 2/1625; B60N 2/163
See application file for complete search history.

(56) References Cited

U.S. PATENT DOCUMENTS

| | | | |
|---|---|---|---|
| 3,706,434 A * | 12/1972 | Martin | B64D 25/10 244/122 AD |
| 4,247,071 A | 1/1981 | Arella et al. | |
| 4,553,726 A | 11/1985 | Jackson | |
| 5,573,205 A * | 11/1996 | Arrone | B64D 25/10 244/122 A |
| 5,931,533 A | 8/1999 | Lance | |
| 10,131,439 B2 | 11/2018 | Mastrolia et al. | |

FOREIGN PATENT DOCUMENTS

| | | |
|---|---|---|
| AT | 348350 | 2/1979 |
| DE | 2616802 | 12/1976 |
| EP | 2921343 | 9/2015 |
| FR | 41869 | 5/1933 |
| FR | 2398473 | 2/1979 |

OTHER PUBLICATIONS

European Patent Office, European Search Report dated Mar. 18, 2021 in Application No. 20200403.2.
Jj.77, "Umklappen der RUcksitzbank—Opel & ISUZU 4x4 Forum", Oct. 30, 2014 (Oct. 30, 2014), pp. 1-5, XP055783227, Retrieved from the Internet: URL: https://opel-offroad.de/viewtopic.php? t=19126 [retrieved on Mar. 9, 2021].
Anonymous, "Loop 'N Strap(TM) Tags—Loop n Strap(TM)—Tags—Safety Tags Safety Signs, Safety Tags and Safety Labels by Accuform Signs", Jul. 2, 2014 (Jul. 2, 2014), pp. 1-3, XP055783239, Retrieved from the Internet URL: https://web.archive.org/web/20140702014733/https://www.accuform.com/safety-tag/1 oop-n-straptrade-tags-TAL325 [retrieved on Mar. 9, 2021].

\* cited by examiner

Primary Examiner — Richard G Davis
(74) Attorney, Agent, or Firm — Snell & Wilmer L.L.P.

(57) ABSTRACT

A seat pan adjustment system for an ejection seat may comprise a guide bracket defining a channel and a seat pan mount configured to translate relative to the guide bracket. A support bracket may extend from a surface of the seat pan mount. A rod may be located through a rod opening defined by the support bracket. The rod may be located in the channel. A biasing member may be coupled to the rod and configured to force the rod away from the surface of the seat pan mount.

15 Claims, 10 Drawing Sheets

SEAT PAN ADJUSTMENT SYSTEM FOR EJECTION SEATS

FIELD

The present disclosure relates to ejection seats, and more specifically, to a seat pan adjustment system for an ejection seat.

BACKGROUND

Ejection seats are designed to expel pilots from an aircraft. The ejection seat may be designed to adapt to the varying biometrics of different seat occupants. For example, it may be desirable to adjust a distance between a seat pan of the ejection seat and a floor of the aircraft for occupants of different heights.

SUMMARY

A seat pan adjustment system for an ejection seat is disclosed herein. In accordance with various embodiments, the seat pan adjustment system may comprise a guide bracket defining a channel and a seat pan mount configured to translate relative to the guide bracket. A support bracket may extend from a surface of the seat pan mount. A rod may be located through a rod opening defined by the support bracket. The rod may be located in the channel. A biasing member may be coupled to the rod and configured to force the rod away from the surface of the seat pan mount.

In various embodiments, a strap may be coupled to the rod. In various embodiments, the strap may be configured to translate in a first direction. Translation of the strap in the first direction may force the rod toward the surface of the seat pan mount.

In various embodiments, the channel may include a lower rod recess and an upper rod recess. In various embodiments, the channel may include a horizontal chamber generally perpendicular to the surface of the seat pan mount, a first vertical chamber generally parallel to the surface of the seat pan mount, and a second vertical chamber generally parallel to the surface of the seat pan mount.

In various embodiments, the horizontal chamber may extend from the lower rod recess to the first vertical chamber, the second vertical chamber may be located between the lower rod recess and the upper rod recess, and the first vertical chamber may be located closer to the surface of the seat pan mount as compared to the second vertical chamber.

In various embodiments, the guide bracket may further include a backdraft damper located between at least one of the lower rod recess and the horizontal chamber, the upper rod recess and the second vertical chamber, or the upper rod recess and an upper interference surface located at an end of the second vertical chamber opposite the lower rod recess.

An ejection seat is also disclosed herein. In accordance with various embodiments, the ejection seat may comprise a seat pan and a seat pan adjustment system configured to translate the seat pan. The seat pan adjustment system may include a guide bracket defining a channel, a seat pan mount configured to translate relative to the guide bracket, a support bracket extending from a surface of the seat pan mount, a rod located through a rod opening defined by the support bracket and in the channel, and a biasing member coupled to the rod and configured to force the rod away from the surface of the seat pan mount.

In various embodiments, strap may be coupled to the rod. In various embodiments, the strap may be configured to translate in a first direction. Translation of the strap in the first direction may force the rod toward the surface of the seat pan mount.

In various embodiments, the channel may include a lower rod recess and an upper rod recess. In various embodiments, the channel may include a horizontal chamber generally perpendicular to the surface of the seat pan mount, a first vertical chamber generally parallel to the surface of the seat pan mount, and a second vertical chamber generally parallel to the surface of the seat pan mount.

In various embodiments, the horizontal chamber may extend from the lower rod recess to the first vertical chamber, and the second vertical chamber may be located between the lower rod recess and the upper rod recess, and the first vertical chamber may be located closer to the surface of the seat pan mount as compared to the second vertical chamber.

In various embodiments, the guide bracket may further include a backdraft damper located between at least one of the lower rod recess and the horizontal chamber, the upper rod recess and the second vertical chamber, or the upper rod recess and an upper interference surface located at an end of the second vertical chamber opposite the lower rod recess.

In various embodiments, the backdraft damper may be configured to pivot about a pivot joint.

A seat pan adjustment system for an ejection seat, in accordance with various embodiments, may comprise a guide bracket defining a first pin orifice and a second pin orifice, and a seat pan mount configured to translate relative to the guide bracket. A pivot bracket may be configured to rotate relative to the seat pan mount. A first rod may be connected to the pivot bracket. A first pin may be connected to the first rod. A first biasing member may be configured to bias the first pin toward the guide bracket.

In various embodiments, the first rod may be coupled to the pivot bracket via a first pivot joint. In various embodiments, a second rod may be connected to the pivot bracket opposite the first rod. A second pin may be connected to the second rod. A second biasing member may be configured to bias the second pin away from the pivot bracket.

In various embodiments, a strap may be coupled to the pivot bracket. In various embodiments, the strap may be configured to translate in a first direction and the pivot bracket may be configured to rotate in a first circumferential direction in response to translation of the strap in the first circumferential direction.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
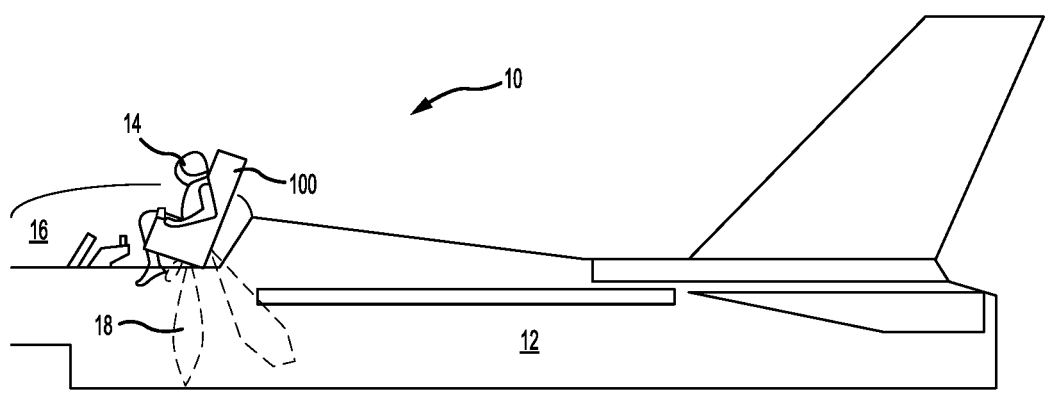
FIG. 1 illustrates an ejection seat being expelled from an aircraft, in accordance with various embodiments.

With reference to FIG. 1, an aircraft ejection system 10 is shown, in accordance with various embodiments. Aircraft ejection system 10 may be installed in aircraft 12 to expel an ejection seat 100 and an occupant 14 of ejection seat 100 from a cockpit 16 of aircraft 12. Ejection seat 100 may be urged from cockpit 16 by a propulsion system 18. As described herein, ejection seat 100 may include a seat pan adjustment system configured to allow occupant 14 to adjust a distance between a seat pan of ejection seat 100 and a floor of cockpit 16.

Figure 2A:
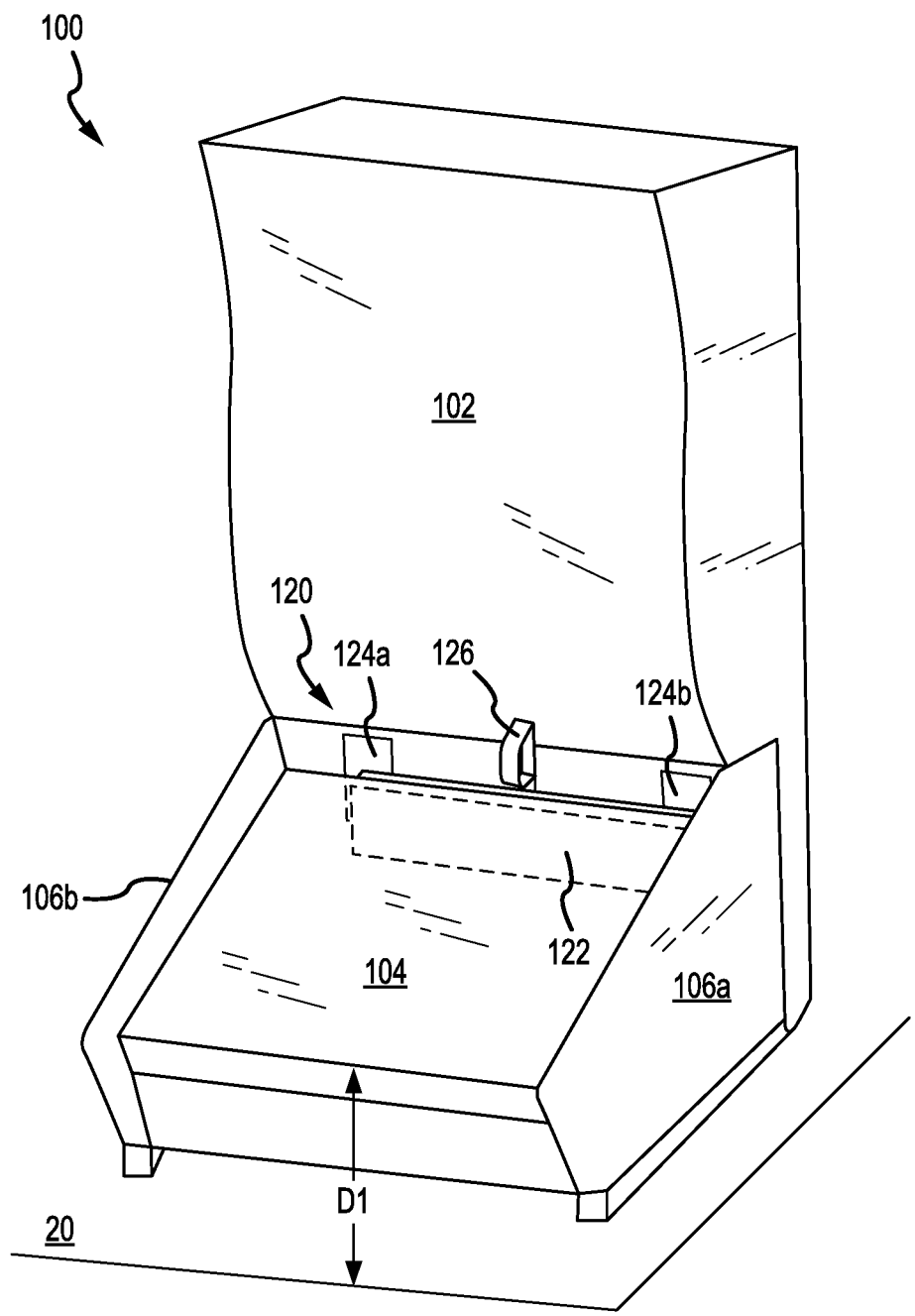
FIGS. 2A and 2B illustrate an ejection seat having a seat pan adjustment system, in accordance with various embodiments.
Figure 2B:
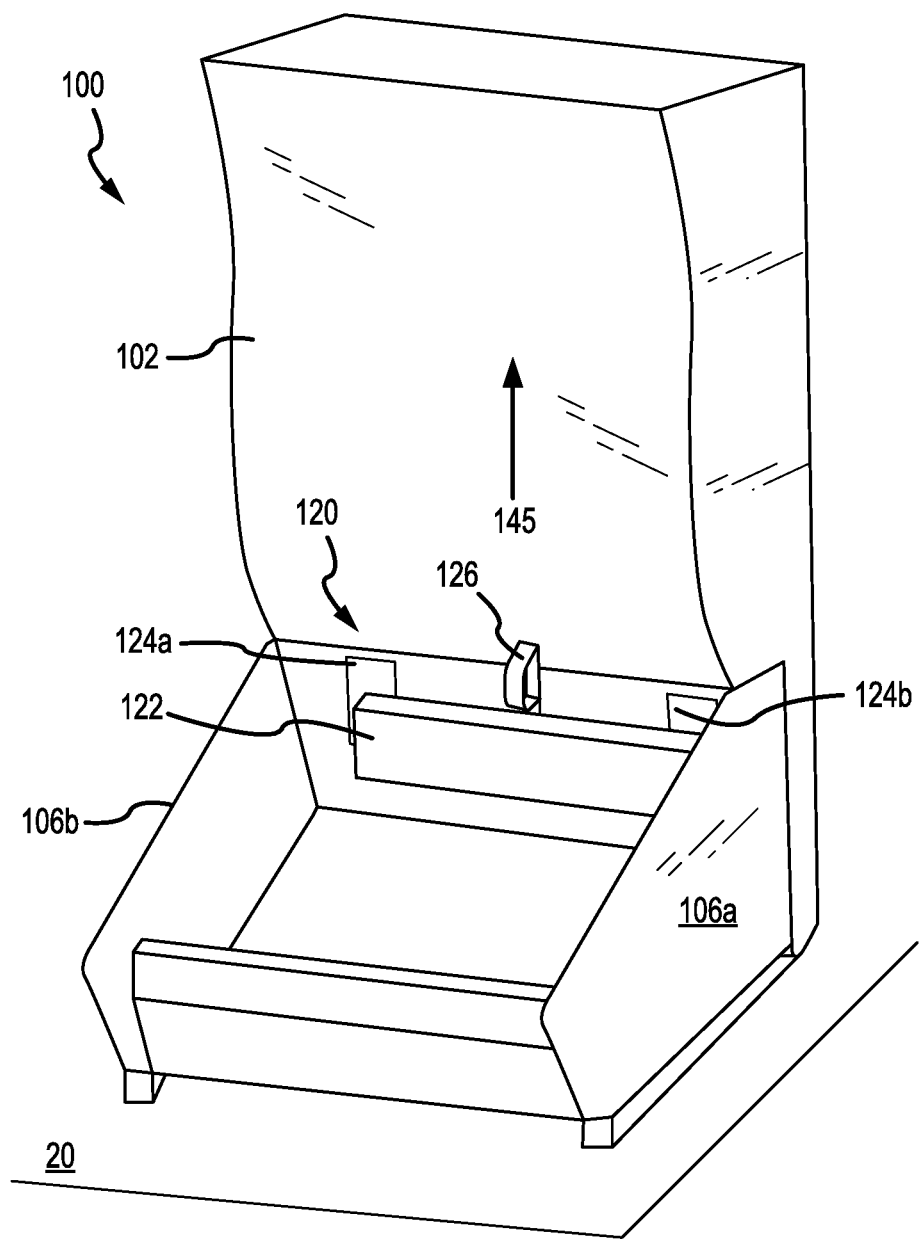

With reference to FIGS. 2A and 2B, ejection seat 100 including a seat pan adjustment system 120 is illustrated. In accordance with various embodiments, ejection seat 100 includes a seat back 102 and a seat pan 104. In FIG. 2B, seat pan 104 has been removed to more clearly illustrated components of seat pan adjustment system 120. A first side panel 106a of ejection seat 100 is located along a first side of seat pan 104. A second side panel 106b of ejection seat 100 is located along a second side of seat pan 104, opposite first side panel 106a.

In accordance with various embodiments, ejection seat 100 includes a seat pan adjustment system 120. Seat pan 104 may be operationally coupled to a seat pan mount 122 of seat pan adjustment system 120. In this regard, seat pan 104 may translate in response to translation of seat pan mount 122. Stated differently, seat pan mount 122 may be configured to translate seat pan 104, such that translation of seat pan mount 122 is transferred to seat pan 104. Seat pan adjustment system 120 may include a first guide bracket 124a and a second guide bracket 124b. First and second guide brackets 124a, 124b may be mounted to a frame or other stationary structure of ejection seat 100. Seat pan mount 122 may be configured to translate relative to first and second guide brackets 124a, 124b. Translation of seat pan mount 122 relative to first and second guide brackets 124a, 124b may result in a change in a distance D1 between seat pan 104 and a floor 20 of the aircraft.

Seat pan adjustment system 120 may include a strap 126. Strap 126 may be operationally coupled to seat pan mount 122. As described in further detail below, actuation of strap 126 by, for example, an occupant of ejection seat 100, may cause seat pan mount 122 to translate relative to first and second guide brackets 124a, 124b, thereby adjusting the distance D1 between seat pan 104 and floor 20.

Figure 3A:
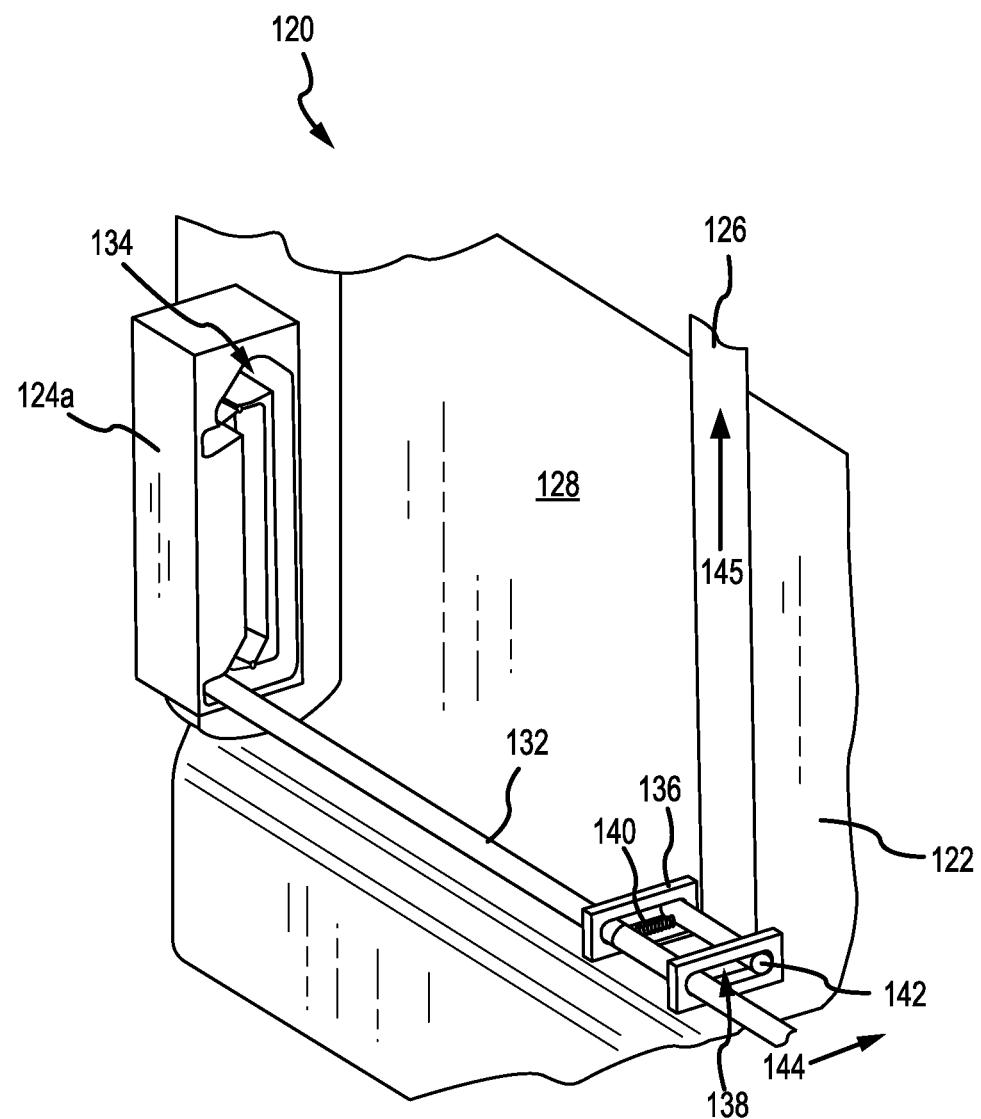
FIGS. 3A and 3B illustrate a seat pan adjustment system for an ejection seat, in accordance with various embodiments.
Figure 3B:
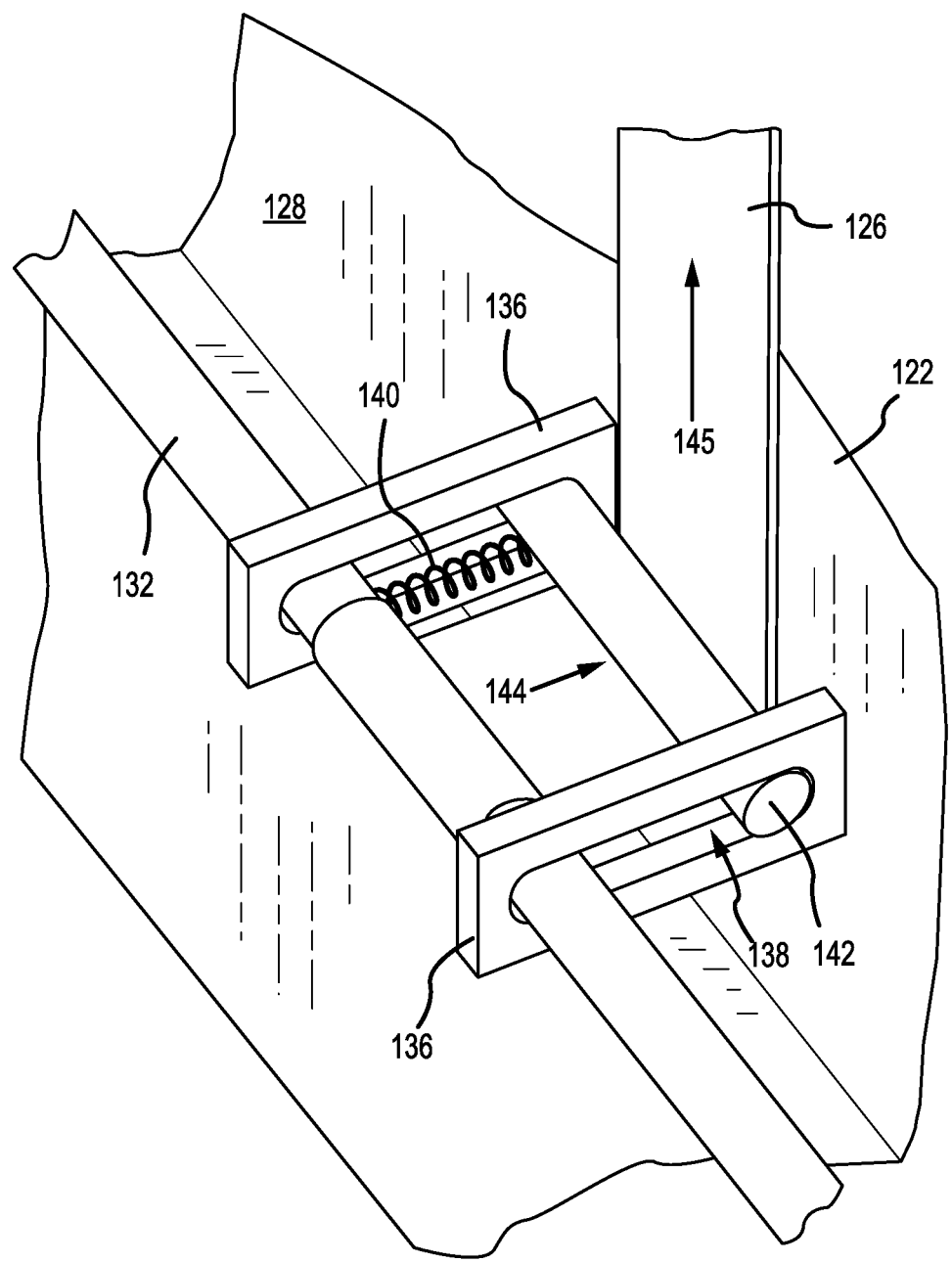
Figure 3C:
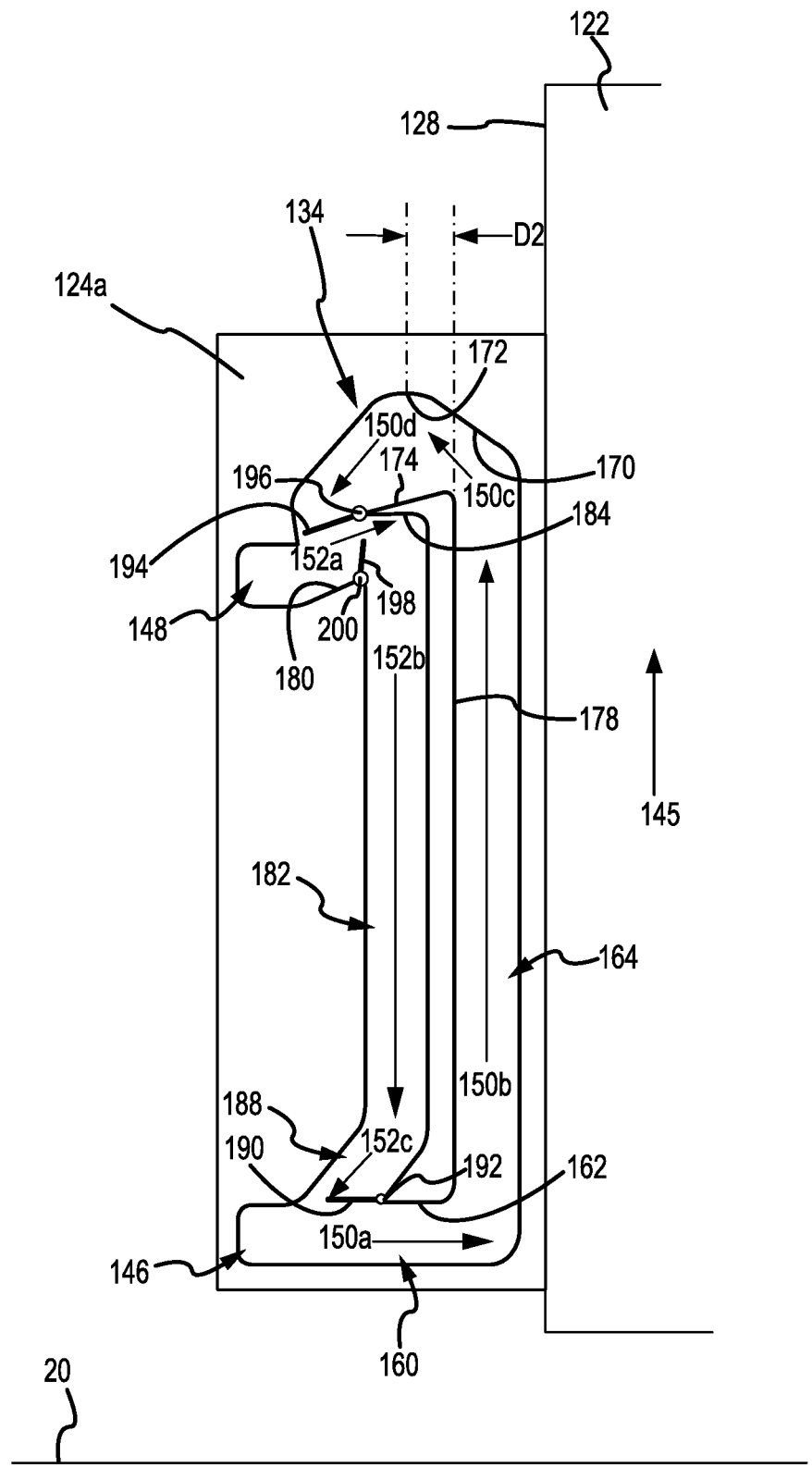
FIG. 3C illustrates a guide bracket of a seat pan adjustment system for an ejection seat, in accordance with various embodiments.

With reference to FIGS. 3A and 3B, additional details of seat pan adjustment system 120 are illustrated, in accordance with various embodiments. In various embodiments, seat pan adjustment system 120 may include a rod 132. Rod 132 may comprise a relatively rigid structure. Rod 132 may include a circular, square, triangular, or any other desired shape cross-section. Rod 132 may be formed from a metal, metal alloy, plastic, ceramic, wood, composite, or any other suitably rigid material. Rod 132 may be located in a channel 134 defined by first guide bracket 124a. While FIGS. 3A and 3C illustrate first guide bracket 124a, it is contemplated and understood that second guide bracket 124b, with momentary reference to FIG. 2A, includes the elements and functionalities as described herein with respect to first guide bracket 124a. Channel 134 may guide translation of rod 132 relative to first guide bracket 124a.

Seat pan adjustment system 120 may include one or more support bracket(s) 134. Support bracket(s) 136 may be mounted to seat pan mount 122. In various embodiments, support bracket(s) 136 may be integral with seat pan mount 122, such that support bracket(s) 136 and seat pan mount 122 are formed from a single, monolithic piece of material. Support bracket(s) 136 may extend from a surface 128 of seat pan mount 122. Surface 128 is oriented generally away from seat pan 104 in FIG. 2A. Support bracket(s) 136 may define a rod opening 138. Rod 132 may be located through rod opening 138. Rod opening 138 is configured allow rod 132 to translate toward and away from surface 128 of seat pan mount 122. In this regard, rod opening 138 may have a generally oval or racetrack shape.

Seat pan adjustment system 120 may include one or more biasing member(s) 140. Biasing member 140 may be configured to apply a biasing force against rod 132 in a direction away from surface 128 of seat pan mount 122. Biasing member 140 may be a compression spring, tension spring, or any other component capable of forcing rod 132 away from surface 128. In various embodiments, a support pin 142 may be located in rod opening 138. Biasing member 140 may extend between support pin 142 and rod 132. Strap 126 is coupled to rod 132. In accordance with various embodiments, strap 126 is configured to translate rod 132 toward surface 128 (i.e., in the direction of arrow 144) in response to a force greater than the spring force of biasing member 140 being applied to strap 126 in the direction of arrow 145 (i.e., in a direction away from floor 20). Rod 132 is configured to translate away from surface 128 (i.e., in a direction opposite arrow 144) in response to the spring force of biasing member 140 exceeding the force being applied by strap 126. In various embodiments, rod 132 may translate in a direction generally perpendicular to surface 128 in response to translation of strap 126 in direction generally parallel to surface 128. As used herein, "generally perpendicular" means ±10° from perpendicular, and "generally parallel" means ±10° from parallel.

With combined reference to FIGS. 3B and 3C, and continuing reference to FIG. 2A, channel 134 of first guide bracket 124a may guide translation of rod 132. Channel 134 may include (i.e., first guide bracket 124a may define) a lower rod recess 146 and an upper rod recess 148. Upper rod recess 148 may be located a greater distance from floor 20, as compared to lower rod recess 146. Lower and upper rod recesses 146, 148 may be configured to receive rod 132. In this regard, lower and upper rod recesses 146, 148 may be configured such that when rod 132 is located in lower rod recess 146 or upper rod recess 148, vertical translation of rod 132 is restricted. Vertical translation of rod 132 may be in a direction parallel to surface 128 and/or perpendicular to floor 20. In accordance with various embodiments, seat pan adjustment system 120 is configured such that an operator (e.g., an occupant of ejection seat 100 in FIG. 1) may translate rod 132 between lower rod recess 146 and upper rod recess 148 by applying a force in the direction of arrow 145 to strap 126 (e.g., in a direction generally away from floor 20 and parallel to surface 128).

For example, to translate rod 132 from lower rod recess 146 to upper rod recess 148 (i.e., to increase the distance D1, in FIG. 2A, between seat pan 104 and floor 20), the operator translates (e.g., pulls) strap 126 in the direction of arrow 145 by exceeding the biasing force of biasing member 140, thereby forcing rod 132 to translate in direction 150a within a horizontal chamber 160 of channel 134. Direction 150a may be toward surface 128 and generally parallel to floor 20 and/or generally perpendicular to surface 128. Horizontal chamber 160 may be defined, at least partially, by an upper wall 162. Upper wall 162 may generate an interference with rod 132, thereby restricting translation of rod 132 in the direction of arrow 145. In various embodiments, direction 150a and upper wall 162 may be generally parallel to floor 20 and/or generally perpendicular to surface 128.

Horizontal chamber 160 may be connected to a first vertical chamber 164 of channel 134. First vertical chamber 164 may be generally perpendicular to floor 20 and/or generally parallel to surface 128. In accordance with various embodiments, once the interference generated by upper wall 162 of horizontal chamber 160 is removed, the force applied to strap 126 causes rod 132 to translate through first vertical chamber 164 in direction 150b. Direction 150b may be away from floor 20 and generally parallel to surface 128.

Channel 134 is further defined by an upward slanted surface 170. Upward slanted surface 170 may extend from first vertical chamber 164 away from floor 20 and surface 128. Upward slanted surface 170 is located at an end of vertical chamber opposite horizontal chamber 160. Upward slanted surface 170 may be extend away from surface 128. Rod 132 may contact upward slanted surface 170 with the force applied to strap 126 causing rod to translate in direction 150c along upward slanted surface 170. Rod 132 may translate in direction 150c until contacting a peak surface 172 of channel 134. Direction 150c may be away from floor 20 and away from surface 128.

Peak surface 172 may include a point of channel 134 located farthest from floor 20. In accordance with various embodiments, a distance between peak surface 172 and floor 20 may be greater than a distance between upper rod recess 148 and floor 20. Peak surface 172 may generate an interference with rod 132. The interference with peak surface 172 tends to block or prevent further translation of strap 126 in the direction of arrow 145. Contact between rod 132 and peak surface 172 may indicate to the operator to decrease the force being applied to strap 126. In response to the operator reducing or removing the force applied to strap 126, rod 132 translates downward toward floor 20 (in the opposite direction of arrow 145). Rod 132 may contact and translate along a slanted surface 174 of channel 134. In this regard, rod 132 may translate toward floor 20 and away from surface 128. Stated differently, channel 134 is configured such that rod 132 will translate from peak surface 172, in direction 150d, and into upper rod recess 148, removal or reduction of the force applied to strap 126 in the direction of arrow 145. Direction 150d may be generally toward floor 20 and away from surface 128. In accordance with various embodiments, a distance D2, as measured between peak surface 172 and a wall 178 defining first vertical chamber 164, may be equal to or greater than a radius of rod 132. Wall 178 may be located proximate slanted surface 174 of channel 134. Channel 134 may be further defined by a slanted surface 180 extending from upper rod recess 148 to a second vertical chamber 182. Slanted surface 180 may facilitate translation of rod 132 into lower rod recess 146. In various embodiments, first vertical chamber 164 is located closer to surface 128, as compared to second vertical chamber 182.

In accordance with various embodiments, rod 132 may be translated from lower rod recess 146 to upper rod recess 148 by translating through channel 134 first in direction 150a, then in direction 150b, then in direction 150c, and then in direction 150d. The force applied to strap 126 exceeding the biasing force of biasing member 140 may force rod 132 in directions 150a, 150b, 150c. Upon contact with peak surface 172 and release of strap 126, rod 132 translates in direction 150d and into upper rod recess 148.

In accordance with various embodiments, to translate rod 132 from upper rod recess 148 to lower rod recess 146 (i.e., to decrease the distance D1 between seat pan 104 and floor 20), the operator translates (e.g., pulls) strap 126 in the direction of arrow 145 by exceeding the biasing force of biasing member 140 and thereby forces rod 132 to translate in direction 152a. Direction 152a may be generally towards surface 128 and away from floor 20. Channel 134 may be defined, at least partially, by an upper interference surface 184. Upper interference surface 184 may be located at an end of second vertical chamber 182 that is generally opposite lower rod recess 146 and floor 20. Upper interference surface 184 may generate an interference with rod 132, thereby restricting translation of rod 132 in direction 152a and preventing further translation of strap 126 in the direction of arrow 145.

Contact between rod 132 and upper interference surface 184 tends to indicate to the operator to reduce the force being applied to strap 126 and/or to apply a force to seat pan 104 in a downward direction toward floor 20 (i.e., in a direction opposite arrow 145). In response to the operator removing the force from strap 126 and/or applying downward force to seat pan 104, rod 132 may begin translating through second vertical chamber 182, in direction 152b. In response to biasing member 140 exceeding the force applied to strap 126, may force rod 132 away from surface 128. Channel 134 may include a slanted chamber 188 connecting second vertical chamber 182 and lower rod recess 146. Biasing member 140 and the walls defining slanted chamber 188 may cause rod 132 to translate in direction 152c and into lower rod recess 146. In various embodiments, direction 152c may be generally away from surface 128 and toward floor 20.

In various embodiments, first guide bracket 124a may include a backdraft damper 190 located between lower rod recess 146 and upper wall 162 of horizontal chamber 160. Backdraft damper 190 may be configured to pivot around a pivot joint 192, in response to rod 132 applying a force to backdraft damper in direction 152c. FIG. 3C shows backdraft damper 190 in the closed position. Backdraft damper 190 may be biased toward the closed position (i.e., in a direction opposite direction 152c). Backdraft damper 190 may be configured to prevent or block rod 132 from translating from lower rod recess 146 into slanted chamber 188.

In various embodiments, first guide bracket 124a may include a backdraft damper 194 located between upper rod recess 148 and upper interference surface 184. Backdraft damper 194 may be configured to pivot around a pivot joint 196, in response to rod 132 applying a force to backdraft damper in direction 150d. FIG. 3C shows backdraft damper 194 in the closed position. Backdraft damper 194 may be biased toward the closed position (i.e., in a direction opposite direction 150d). Backdraft damper 194 may be configured to prevent or block rod 132 from translating toward peak surface 172. Backdraft damper 194 may be configured to guide rod 132 toward upper interference surface 184.

In various embodiments, first guide bracket 124a may include a backdraft damper 198 located between slanted surface 180 and second vertical chamber 182. Backdraft damper 198 may be configured to pivot around a pivot joint 200, in response to rod 132 applying a force to backdraft damper in direction 152a. FIG. 3C shows backdraft damper 198 in the closed position. Backdraft damper 198 may be biased toward the closed position (i.e., in a direction opposite direction 152a). Backdraft damper 198 may be configured to prevent or block rod 132 from upper interference surface 184 into upper rod recess 148. Backdraft damper 198 may be configured to guide rod 132 toward second vertical chamber 182.

Figure 4:
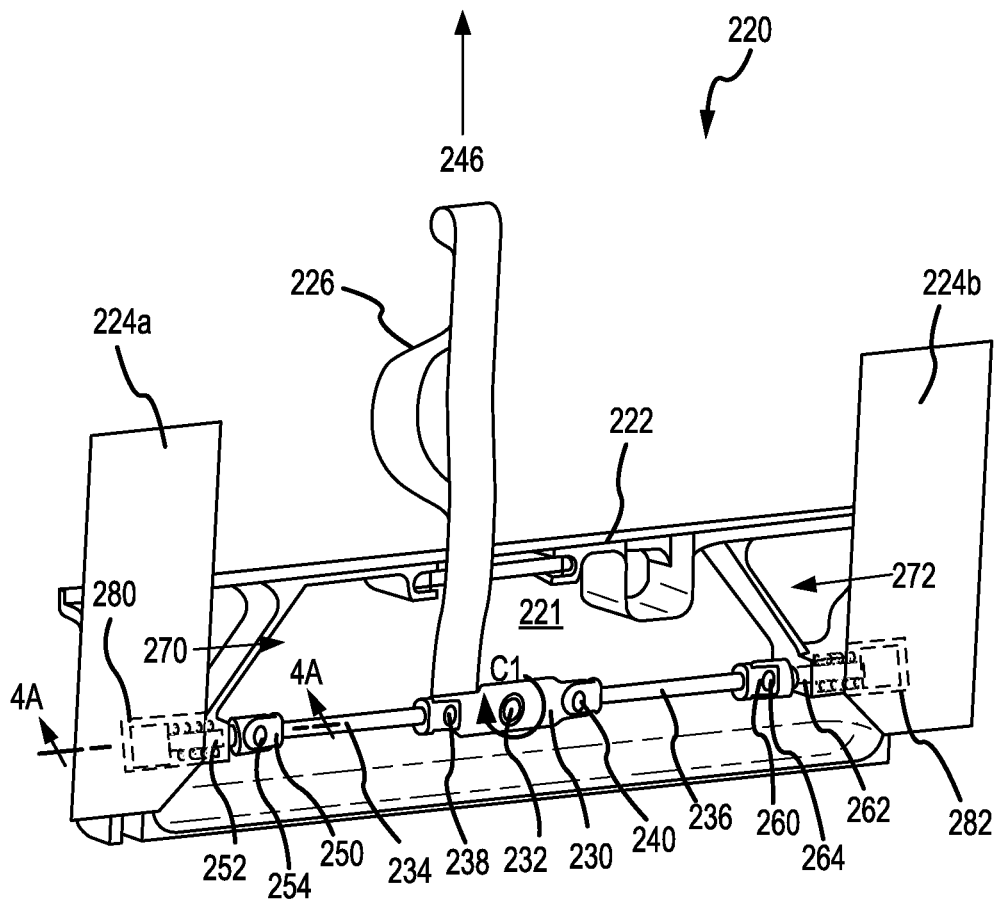
FIG. 4 illustrates a seat pan adjustment system for an ejection seat, in accordance with various embodiments.

With reference to FIG. 4, and continuing reference to FIG. 2A, a seat pan adjustment system 220 is illustrated. In various embodiments, ejection seat 100 may include seat pan adjustment system 220 in place of seat pan adjustment system 120. In accordance with various embodiments, seat pan adjustment system 220 includes a seat pan mount 222. Seat pan 104 may be operationally coupled to a seat pan mount 222 of seat pan adjustment system 220. In this regard, seat pan 104 may translate in response to translation of seat pan mount 222. Stated differently, seat pan mount 222 may be configured to translate seat pan 104, such that translation of seat pan mount 222 is transferred to seat pan 104. Seat pan adjustment system 220 may include a first guide bracket 224a and a second guide bracket 224b. First and second guide brackets 224a, 224b may be mounted to a frame or other stationary structure of ejection seat 100. Seat pan mount 222 may be configured to translate relative to first and second guide brackets 224a, 224b. Translation of seat pan mount 222 relative to first and second guide brackets 224a, 224b may result in a change in the distance D1 between seat pan 104 and the floor 20, with momentary reference to FIG. 2A.

Seat pan adjustment system 220 may include a strap 226. Strap 226 may be operationally coupled to seat pan mount 222. As described in further detail below, actuation of strap 226 by, for example, an occupant of ejection seat 100, may cause seat pan mount 222 to translate relative to first and second guide brackets 224a, 224b, thereby adjusting distance D, in FIG. 2A, between seat pan 104 and floor 20.

In various embodiments, strap 226 may be coupled to a pivot bracket 230 of seat pan adjustment system 220. Translation of strap 226 in the direction of arrow 246 may be configured to cause pivot bracket 230 to rotate in a first circumferential direction C1 about a pivot joint 232. Stated differently, pivot bracket 230 may rotate relative to seat pan mount 222. A surface 221 of seat pan mount 222 may be oriented toward pivot bracket 230. Surface 221 is oriented generally away from seat pan 104 in FIG. 2A.

Seat pan adjustment system 220 includes a first rod 234 and a second rod 236. First rod 234 may be coupled to pivot bracket 230 at a pivot joint 238. Second rod 236 may be coupled to pivot bracket 230 at a pivot joint 240. First rod 234 and second rod 236 may be coupled to opposing ends of pivot bracket 230. First and second rods 234, 236 may comprise relatively rigid structures. First and second rods 234, 236 may be formed from a metal, metal alloy, plastic, ceramic, wood, composite, or any other suitably rigid material.

An end 250 of first rod 234 is connected to a pin 252 via a pivot joint 254. An end 260 of second rod 236 is connected to a pin 262 via a pivot joint 264. Rotation of pivot bracket 230 in circumferential direction C1 is configured to translate first rod 234 and pin 252 away from first guide bracket 224a (e.g., in the direction of arrow 270). Rotation of pivot bracket 230 in circumferential direction C1 is configured to translate second rod 236 and pin 262 away from second guide bracket 224b (e.g., in the direction of arrow 272). Translation of pin 252 in the direction of arrow 270 may translate pin 252 out a lower (or first) pin orifice 280 defined by first guide bracket 224a. Translation of pin 262 in the direction of arrow 272 may translate pin 262 out a lower pin orifice 282 defined by second guide bracket 224b. Locating pins 252, 262 outside lower pin orifices 280, 282, respectively, allows seat pan mount 222 to translate relative to first and second guide brackets 224a, 224b.

Figure 5A:
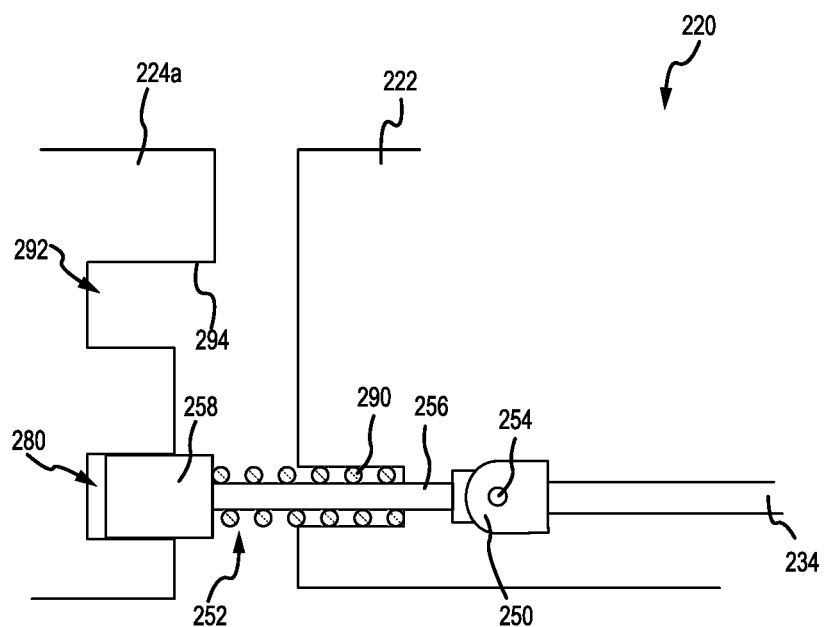
FIGS. 5A, 5B, and 5C illustrate a cross-section view of a seat pan adjustment system for an ejection seat, in accordance with various embodiments.

Referring to FIG. 5A, a cross section of seat pan adjustment system 220, taken along the line 5A-5A in FIG. 4, is illustrated. While FIGS. 5A, 5B, and 5C illustrate first guide bracket 224a and pin 252, it is contemplated and understood that second guide bracket 224b and pin 262, with momentary reference to FIG. 4, include the elements and functionalities as described herein with respect to first guide bracket 224a and pin 252.

Pin 252 may include a shaft 256 and a head 258. Head 258 may be located, at least, partially in the lower pin orifice 280 formed in first guide bracket 224a. Head 258 being located in lower pin orifice 280 tends to prevent translation of seat pan mount 222. A biasing member 290 may be configured to bias head 258 toward first guide bracket 224a. In various embodiments, biasing member 290 may be located between head 258 and seat pan mount 222.

Figure 5B:
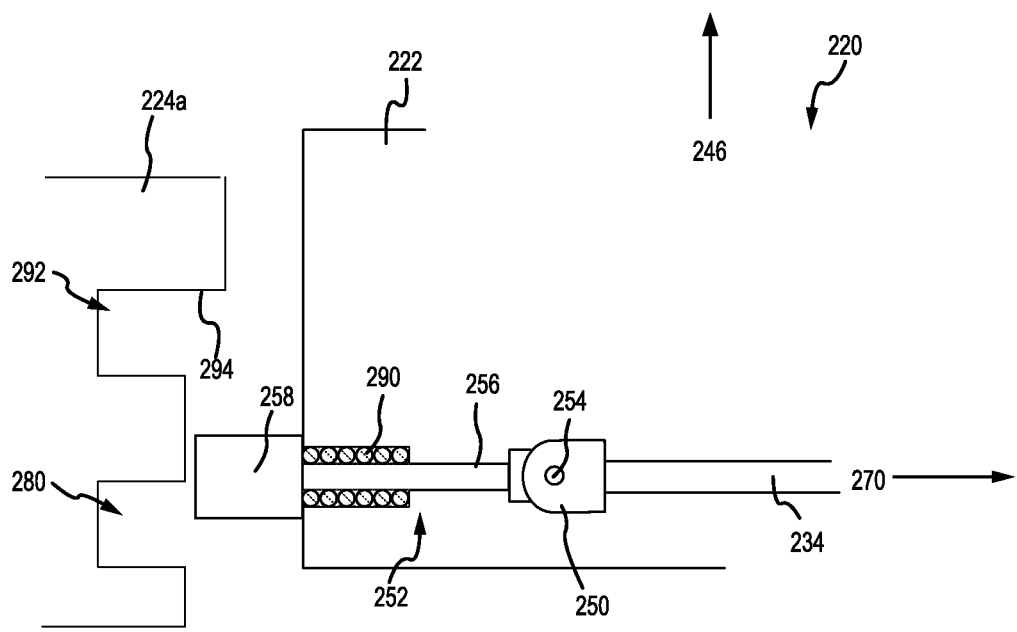

With reference to FIG. 5B, in response to the force applied to strap 226, with momentary reference to FIG. 4, exceeding the biasing force applied to head 258 by biasing member 290, pin 252 may translate in the direction of arrow 270 and out lower pin orifice 280. In various embodiments, the force applied to strap 226 exceeding than the biasing force of biasing member 290 may cause biasing member to compress. In response to pin 252 being located completely outside lower pin orifice 280, seat pan mount 222 may translate relative to first guide bracket 224a (e.g., in the direction of arrow 246).

Figure 5C:
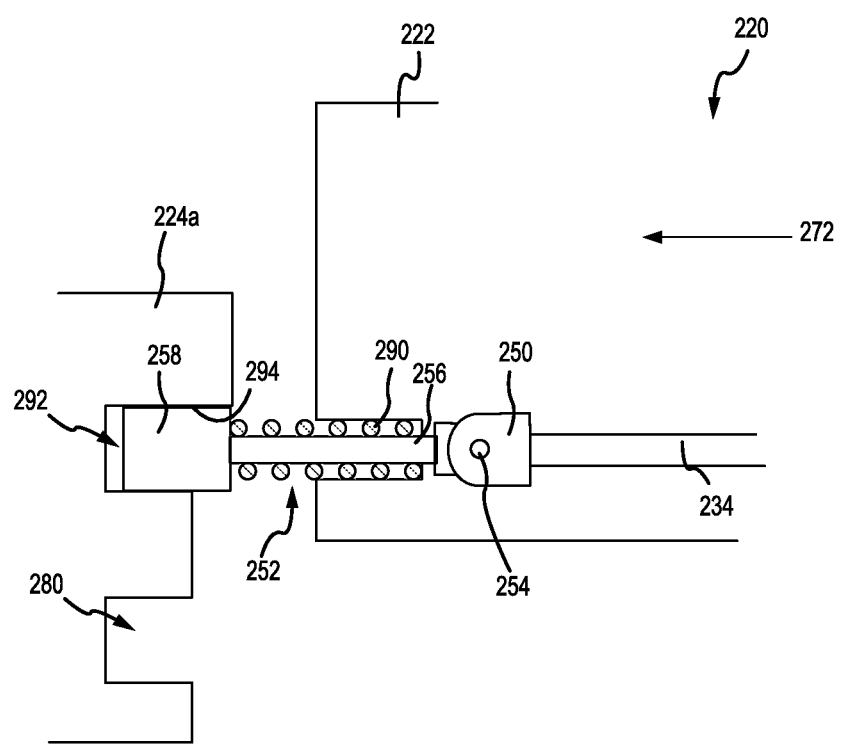

With reference to FIG. 5C, in response to the biasing force applied by biasing member 290 exceeding the force applied to strap 226, head 258 of pin 252 translates in the opposite direction of arrow 272 and into upper (or second) pin orifice 292. In various embodiments, head 258 of pin 252 may contact an interference surface 294 of first guide bracket 224a. Interference surface 294 may generate an interference with pin head 228 and prevent further translation of strap 226 in the direction of arrow 246. Contact between head 258 of pin 252 and interference surface 294 tends to indicate to the operator to decrease the force being applied to strap 226. In response to the operator reducing or removing the force applied to strap 226, biasing member 290 forces head 258 of pin 252 into the upper pin orifice 292, thereby preventing further translation of seat pan mount 222.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An ejection seat seat pan adjustment system, comprising:
    a guide bracket defining a channel;
    a seat pan mount configured to translate relative to the guide bracket;
    a support bracket extending from a surface of the seat pan mount;
    a rod located through a rod opening defined by the support bracket, wherein the rod is located in the channel; and
    a biasing member coupled to the rod and configured to force the rod away from the surface of the seat pan mount.

2. The seat pan adjustment system of claim 1, further comprising a strap coupled to the rod.

3. The seat pan adjustment system of claim 2, wherein the strap is configured to translate in a first direction, and wherein translation of the strap in the first direction forces the rod toward the surface of the seat pan mount.

4. The seat pan adjustment system of claim 1, wherein the channel includes a lower rod recess and an upper rod recess.

5. The seat pan adjustment system of claim 4, wherein the channel includes a horizontal chamber generally perpendicular to the surface of the seat pan mount, a first vertical chamber generally parallel to the surface of the seat pan mount, and a second vertical chamber generally parallel to the surface of the seat pan mount.

6. The seat pan adjustment system of claim 5, wherein the horizontal chamber extends from the lower rod recess to the first vertical chamber, and wherein the second vertical chamber is located between the lower rod recess and the upper rod recess, and wherein the first vertical chamber is located closer to the surface of the seat pan mount as compared to the second vertical chamber.

7. The seat pan adjustment system of claim 6, wherein the guide bracket further includes a backdraft damper located between at least one of the lower rod recess and the horizontal chamber, the upper rod recess and the second vertical chamber, or the upper rod recess and an upper interference surface located at an end of the second vertical chamber opposite the lower rod recess.

8. An ejection seat, comprising:
    a seat pan; and
    a seat pan adjustment system configured to translate the seat pan, the seat pan adjustment system including:
        a guide bracket defining a channel;
        a seat pan mount configured to translate relative to the guide bracket;
        a support bracket extending from a surface of the seat pan mount;
        a rod located through a rod opening defined by the support bracket, wherein the rod is located in the channel; and
        a biasing member coupled to the rod and configured to force the rod away from the surface of the seat pan mount.

9. The ejection seat of claim 8, further comprising a strap coupled to the rod.

10. The ejection seat of claim 9, wherein the strap is configured to translate in a first direction, and wherein translation of the strap in the first direction forces the rod toward the surface of the seat pan mount.

11. The ejection seat of claim 8, wherein the channel includes a lower rod recess and an upper rod recess.

12. The ejection seat of claim 11, wherein the channel includes a horizontal chamber generally perpendicular to the surface of the seat pan mount, a first vertical chamber generally parallel to the surface of the seat pan mount, and a second vertical chamber generally parallel to the surface of the seat pan mount.

13. The ejection seat of claim 12, wherein the horizontal chamber extends from the lower rod recess to the first vertical chamber, and wherein the second vertical chamber is located between the lower rod recess and the upper rod recess, and wherein the first vertical chamber is located closer to the surface of the seat pan mount as compared to the second vertical chamber.

14. The ejection seat of claim 13, wherein the guide bracket further includes a backdraft damper located between at least one of the lower rod recess and the horizontal chamber, the upper rod recess and the second vertical chamber, or the upper rod recess and an upper interference surface located at an end of the second vertical chamber opposite the lower rod recess.

15. The ejection seat of claim 14, wherein the backdraft damper is configured to pivot about a pivot joint.

\* \* \* \* \*